UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDING MATERIAL AND PROCESS OF MAKING THE SAME.

1,227,465.     Specification of Letters Patent.     Patented May 22, 1917.

No Drawing.     Application filed July 3, 1914. Serial No. 848,806.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Molding Materials and Processes of Making the Same, of which the following is a specification.

My invention relates to molding materials and processes of making them, and it has special reference to the manufacture of molding materials suitable for use as electric insulation.

The object of my invention is to provide a novel, cheap and effective molding material that can be readily molded without the application of heat or of expensive solvents, and which, when molded, is of high insulating efficiency.

My process is based upon the fact that certain gums and resins, such as shellac, copal and the synthetic resins of the bakelite type, are soluble in dilute alkaline solutions, from which they may be precipitated by means of tannic acid, alkali-metal tannate being simultaneously formed and thrown down. The tannate does not render the gum or resin soluble, as free alkali would do, but forms with the gum or resin a plastic mass which is insoluble in water and which can be readily molded in the cold to form hard and durable articles of high dielectric strength.

In carrying out one example of my process, I proceed by dissolving shellac in a weak alkaline solution, such as a 5% solution of borax, sodium hydroxid or potassium hydroxid. I then add to the resulting solution sufficient concentrated tannic acid to precipitate the shellac and also to throw down the alkali metal as an alkali-metal tannate. The precipitate, consisting of mixed shellac and alkali-metal tannate, is then filtered out of the liquid, washed and dried, forming my novel molding material. This material may be handled in any well known or convenient way for the preparation of molded insulation or other molded articles, either with or without the addition of the usual inert fillers, such as ground asbestos or wood flour, and it is to be particularly noted that it is capable of being readily molded without the application of heat. If desired, fillers may be mixed with the alkaline solution of shellac before the addition of tannic acid. By this means, a very uniform mixture of the filler with the precipitated material is produced.

The alkali-metal tannate may, if desired, be prepared separately from the shellac or other adhesive substance by reacting upon a suitable alkaline substance with tannic acid, the tannate and the adhesive being then ground together, but I prefer to precipitate the adhesive and the tannate from the same solution, because of the intimate mixture of the two substances that is thus produced, and because of the inconvenience that attends the grinding of shellac and other solid gums.

In the subjoined claims, the expression "varnish adhesive" is to be understood as a generic term, including all gums, resins, gum-resins and synthetic resins which can be used as binders in molding plastic substances.

When shellac is the gum employed, it may be used in any of its ordinary commercial forms, and any of the soluble tannic acids may likewise be employed. It is to be understood that my invention is not restricted to the use of any particular variety of alkali-soluble adhesive substance or to any specific tannin, but is limited only by the scope of the appended claims.

I claim as my invention:

1. A composition capable of being molded containing a varnish adhesive precipitated in admixture with a metallic tannate.

2. A composition capable of being molded containing a varnish adhesive and an alkali-metal tannate.

3. A composition capable of being molded and comprising an intimate mixture of a varnish adhesive substance and an alkali-metal tannate.

4. A composition capable of being molded and comprising a resin precipitated in admixture with a metallic tannate.

5. A composition capable of being molded containing shellac and a metallic tannate.

6. A composition capable of being molded containing a resin and an alkali-metal tannate.

7. A composition capable of being molded containing shellac and an alkali-metal tannate.

8. A process of making plastic compositions that comprises precipitating from a single solution a mixture of a varnish adhesive and a metallic tannate.

9. A process of making plastic compositions that comprises dissolving a varnish adhesive in an alkaline liquid and adding tannic acid to the resulting solution.

10. A process of making plastic compositions that comprises dissolving shellac in an alkaline liquid and adding tannic acid to the resulting solution.

11. A process of making plastic compositions that comprises dissolving a varnish adhesive in a dilute solution of an alkali metal hydroxid and adding tannic acid to the resulting solution.

12. A process of making plastic compositions that consists in dissolving shellac in a dilute solution of an alkali metal hydroxid, adding to the resulting solution sufficient tannic acid to precipitate the alkali-metal as alkali-metal tannate, together with the shellac and recovering the precipitate.

13. A process of making a plastic composition that consists in dissolving shellac in a dilute solution of sodium hydroxid, adding to the resulting solution sufficient tannic acid to precipitate the sodium and the shellac as a mixture of sodium tannate and shellac, and recovering the precipitate.

In testimony whereof, I have hereunto subscribed my name this 30th day of June, 1914.

JAMES P. A. McCOY.

Witnesses:
W. H. KEMPTON,
B. B. HINES.